United States Patent [19]

Lewington et al.

[11] Patent Number: 5,454,174
[45] Date of Patent: Oct. 3, 1995

[54] POSITION SETTING DEVICE AND SECURING ARRANGEMENT FOR AN EXTENSOMETER

[75] Inventors: Christopher R. Lewington, Maidenhead; Keith P. Johnson, Bracknell, both of England

[73] Assignee: Instron Limited, Buckinghamshire, United Kingdom

[21] Appl. No.: 203,647

[22] Filed: Mar. 1, 1994

[30] Foreign Application Priority Data

Mar. 1, 1993 [GB] United Kingdom ............... 9304082

[51] Int. Cl.⁶ .................. G01N 3/04; G01B 5/30; G01B 7/16
[52] U.S. Cl. ................................. 33/787; 33/790
[58] Field of Search ................... 33/787, 788, 789, 33/790; 24/457, 563; 73/856, 860

[56] References Cited

U.S. PATENT DOCUMENTS

| | | | |
|---|---|---|---|
| 2,347,234 | 4/1944 | Allen | 24/457 |
| 3,789,508 | 2/1974 | Meline | 33/788 |
| 4,507,871 | 4/1985 | Meyer et al. | 33/790 |
| 5,119,569 | 6/1992 | Meline | 33/790 |
| 5,123,175 | 6/1992 | Van Der Kuur | 33/790 |

FOREIGN PATENT DOCUMENTS

| | | |
|---|---|---|
| 2038923 | 7/1980 | United Kingdom . |
| 2180758 | 4/1987 | United Kingdom . |
| 2220438 | 1/1990 | United Kingdom . |

*Primary Examiner*—Christopher W. Fulton
*Attorney, Agent, or Firm*—Fish & Richardson

[57] ABSTRACT

An extensometer includes a first element and second element to be set at a predetermined distance apart, with a coupling for setting and holding the two elements at the predetermined distance apart. The coupling is movable by the action of a biasing force to an engaging disposition in which it engages with the two elements to set and hold the two elements at the predetermined distance apart, and the coupling moves under action of the biasing force to a disengaged disposition in which it no longer holds the two elements at the predetermined distance apart upon removal or sufficient relaxation of the applied force.

26 Claims, 2 Drawing Sheets

POSITION SETTING DEVICE AND SECURING ARRANGEMENT FOR AN EXTENSOMETER

The present invention according to a first of its aspects relates to a position setting device for setting and holding two elements at a predetermined distance apart, and is primarily, but not exclusively, concerned with an extensometer.

An extensometer is a device that measures a change in distance between two reference points and has particular application in measuring the engineering strain of a specimen which is under load.

The engineering strain of a specimen $\epsilon$ is given by the equation:

$$\epsilon = \Delta L/L$$

where $\Delta L$ is the change in length of the specimen and $L$ is the original length of the specimen. The original length of the specimen is commonly known as the gauge length. For the strain of a specimen to be accurately measured it is a prerequisite for the gauge length to be accurately defined.

To this end, an extensometer typically includes two specimen engaging means, each being supported on a displaceable arm. Coupling means are provided to engage the two displaceable arms and thereby set and hold the specimen engaging means at a predetermined distance apart. This predetermined distance apart defines the gauge length.

Whilst the two specimen engaging means are held at the predetermined distance apart by the coupling means, spring clip means are used to secure both of the specimen engaging means to the specimen which is to be tested under load.

At this point the coupling means is disengaged from the displaceable arms so that the specimen engaging means are kept in contact with the specimen at the predetermined set distance apart by the clip means. The extensometer is then ready to be used to determine the strain of the specimen.

Once testing of the specimen begins, the specimen engaging means are displaced from their predetermined set distance apart under action of the deformation experienced by the specimen due to the loading. The degree of displacement of the specimen engaging means from their predetermined set distance apart is indicative of the strain of the specimen.

In a typical extensometer, the displacement of the specimen engaging means from their predetermined set distance apart is used to generate an electrical signal representative of the strain of the specimen.

In extensometers according to the prior art, it has been made known to provide each of the two displaceable arms with a coupling element. When the specimen engaging means are at their predetermined set distance apart, apertures provided in each of the coupling elements become aligned with each other.

To set and hold the specimen engaging means at the predetermined distance apart a pin is inserted through the aligned apertures of the coupling elements so as to couple the two displaceable arms together.

After the specimen engaging means have been secured to the specimen by spring clip means, the pin is retracted from the aligned apertures so as to allow testing of the specimen to begin.

A disadvantage with holding the specimen engaging means of an extensometer at the predetermined set distance apart by coupling the two displaceable arms with a pin of the type described above is that a test is void if the pin is forgotten to be retracted from the aligned apertures of the coupling elements after securing the specimen engaging means with the spring clip means to the specimen, since the specimen engaging means will not be able to move under action of the deformation of the specimen. Futhermore, since a pin of the type described above is not an integral part of the extensometer, it is easy to lose.

In addition, inaccuracies in the setting of the gauge length arise due to the need for there to be a clearance to allow the pin to be inserted through the aligned apertures. These inaccuracies are further exasperated by wear of the pin and the aperture inner surfaces.

In extensometers made known in the prior art it is typically necessary to (i) fasten, for example by a screw cap, a first clip portion of the spring clip means to the displaceable arm which supports the specimen engaging means which the spring clip means is to secure to the specimen, and then (ii) manoeuvre by hand a second clip portion of the spring clip means onto the surface of the specimen remote from the specimen engaging means so that the specimen can be brought to bear onto the specimen engaging means by the biasing force of the second clip portion of the spring clip means.

In some applications, however, it is necessary for an extensometer to be located and worked in an environment where access is severely restricted, for example in a temperature cabinet. This presents particular problems when it comes to securing the specimen engaging means to the specimen to be tested. Single-handed operation of an extensometer in such circumstances would obviously be an advantage.

It is an object of the present invention to alleviate the aforementioned difficulties and disadvantages of the extensometers according to the prior art.

According to a first aspect of the invention there is provided a position setting device comprising a first element and a second element to be set at a predetermined distance apart and coupling means for setting and holding the two elements at the predetermined distance apart, the coupling means being movable by the action of an applied force against the action of a biasing force to an engaging disposition in which it engages with the two elements to set and hold the two elements at the predetermined distance apart, and the coupling means being movable under the action of the biasing force to a disengaged disposition in which it no longer holds the two elements at the predetermined distance apart upon removal or sufficient relaxation of the applied force.

In an embodiment of the invention hereinafter to be described the first element comprises a first displaceable arm which supports a first means for engaging a specimen, the second element comprises a second displaceable arm which supports a second means for engaging the specimen, the coupling means in its engaging disposition engaging the first and second arms to set and hold the first and second specimen engaging means at a predetermined distance apart, and which in its disengaged disposition no longer holds the first and second specimen engaging means at the predetermined distance apart.

In an embodiment of the invention hereinafter to be described the coupling means comprises a first coupling element which is supported by the first arm and which extends to a position in proximity of the second arm and a second coupling element which is supported by the second arm, the second coupling element being movable by the action of an applied force against the action of the biasing force to an engaged disposition in which it engages with the first coupling element to set and hold the first and second specimen engaging means at the predetermined distance apart and the second coupling element being movable under the action of the biasing force to a disengaged disposition in which it no longer engages with the first coupling element upon removal or sufficient relaxation of the applied force. Advantageously, the second coupling element has an engaging end so dimensioned as to closely fit in a recess or hole provided in the first coupling element.

In a further embodiment of the invention hereinafter to be described the second coupling element extends through an opening provided in the second arm and the biasing force is provided by biasing means located on the end of the second coupling element opposite to that which engages with the first coupling element.

In yet another embodiment of the invention hereinafter to be described force applying means are provided at the end of the second coupling element opposite to that which engages with the first coupling element. Conveniently, the second coupling element is brought to its engaging disposition by applying a force to the force applying means, and the biasing means acts to bring the second coupling element to its disengaged disposition upon removal or sufficient relaxation of the applied force.

In an embodiment of the invention hereinafter to be described the second coupling element is a plunger with the engaging end thereof being conical in shape and the recess or hole provided in the first coupling element being tapered.

In an embodiment of the invention hereinafter to be described the first and second specimen engaging means are knife-edge elements and the biasing means is a compression spring.

According to a second aspect of the invention there is provided an extensometer which includes a position setting device according to the first aspect of the invention.

According to a third aspect of the invention there is provided a biasing arrangement for holding a first element in contact with a front face of a second element, the biasing arrangement comprising clip means having a first clip portion which engages with the first element, a second clip portion which engages the second element at a rear face thereof and an intermediate clip portion connecting the first and second clip portions, the first clip portion being secured to the first element and the second clip portion being so shaped and biased by a biasing force as to be engagable with the rear face of the second element by a displacement of the first element to cause a displacement of the clip means and a displacement of the second clip portion against the biasing force thereof to an engaging disposition in which the biasing force of the second clip portion causes the second clip portion to bear against the rear face of the second element and to hold the first element against the front face of the second element.

In an embodiment of the invention hereinafter to be described the first clip portion of the clip means or the first element or the first clip portion and the first element are so shaped and the first clip portion is so biased by a biasing force that the first clip portion is securable in or on the first element by a displacement of the clip means in a predetermined direction and by a displacement of the first clip portion against the action of the biasing force thereof and is held in or on the first element under the action of the biasing force.

In an embodiment of the invention hereinafter to be described the first element is formed with a slot therein, the first clip portion or the slot or the first clip portion and the slot are so shaped and the first clip portion is so biased by the biasing force that the first clip portion is insertable in the slot by a displacement of the clip means in the predetermined direction and by a displacement of the first clip portion against the action of the bias thereof and is held within the slot under the action of the bias.

In a convenient embodiment of the invention hereinafter to be described the first clip portion is of generally V-shape configuration and is formed by two limb parts connected by a bridging part, the first clip portion is secured to the first element by inserting the bridging part into the slot, the slot is so shaped and the first clip portion so biased by the biasing force that as the first clip portion is inserted into the slot the angle subtended by the limb parts decreases against the action of the bias of the first clip portion, and the action of the bias of the first clip portion holds the first clip portion within the slot. Advantageously, the intermediate clip portion is of generally C-shape configuration and provides the bias for the second clip portion.

In an embodiment of the invention hereinafter to be described one of the limb parts of the first clip portion is configured to include an engaging portion which engages with a complementary engaging portion in the slot when the first clip portion is inserted to a holding disposition in the slot to secure the first clip portion within the slot.

In yet another embodiment of the invention hereinafter to be described the first clip portion is inserted into the slot by displacement of the clip means in the predetermined direction and the second clip portion is so positioned as to engage with the rear face of the second element by a displacement of the clip means in the predetermined direction.

In an embodiment of the invention hereinafter to be described the clip means is an elongate clip element formed from a resilient material and preferably from a spring steel wire.

In a further embodiment of the invention hereinafter to be described the clip element is so configured that the clip means can in a single predetermined displacement in the predetermined direction bring the first clip portion into secure engagement with the first element and the second clip portion into engagement with the rear face of the second element.

In a further embodiment of the third aspect of the invention hereinafter to be described the first element is a displaceable arm, the second element is a specimen and the front face of the displaceable arm is constituted by specimen engaging means supported by the displaceable arm.

According to a fourth aspect of the invention there is provided an extensometer which includes a biasing arrangement according to the third aspect of the invention.

According to a fifth aspect of the invention there is provided an extensometer which includes a position setting device according to the first aspect of the invention and a biasing arrangement according to the third aspect of the invention secured to at least one of the first and second elements of the position setting device.

Embodiments of the invention will now be described by way of example with reference to the accompanying drawings in which.

Figure 1:
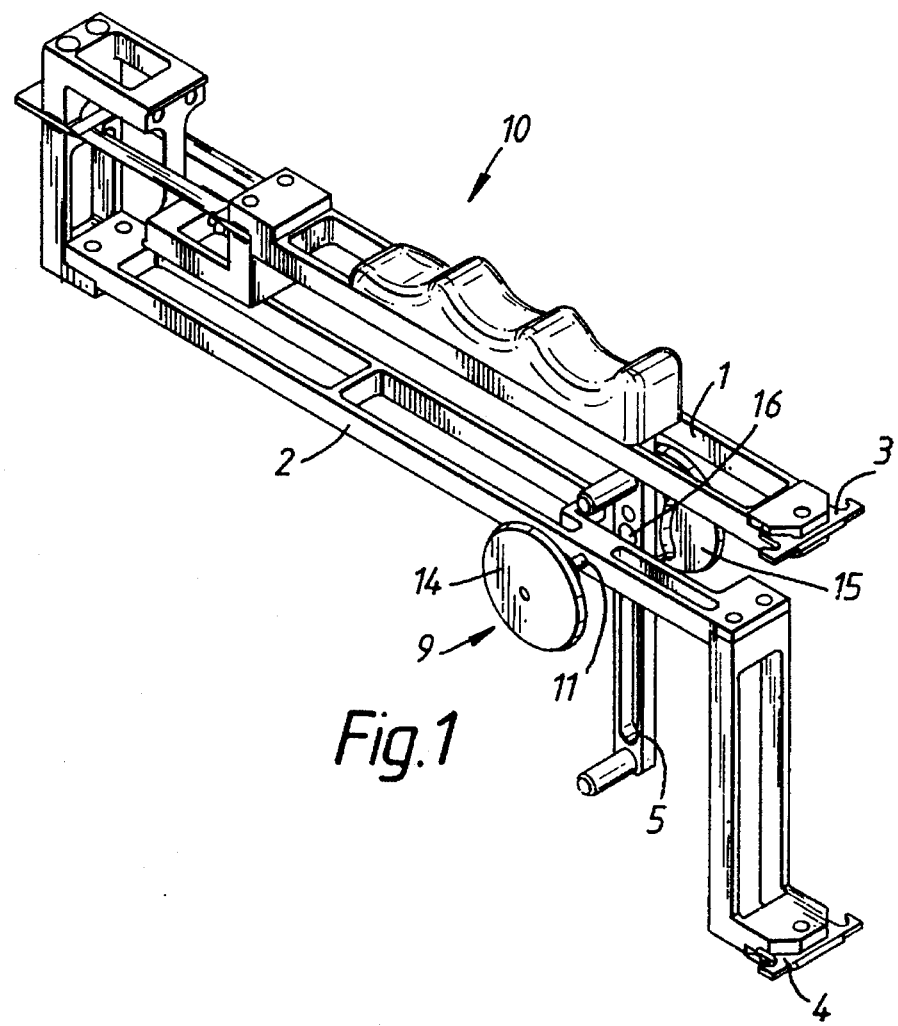
FIG. 1 is a schematic view of an extensometer including a position setting device according to the first aspect of the invention.
Figure 2:
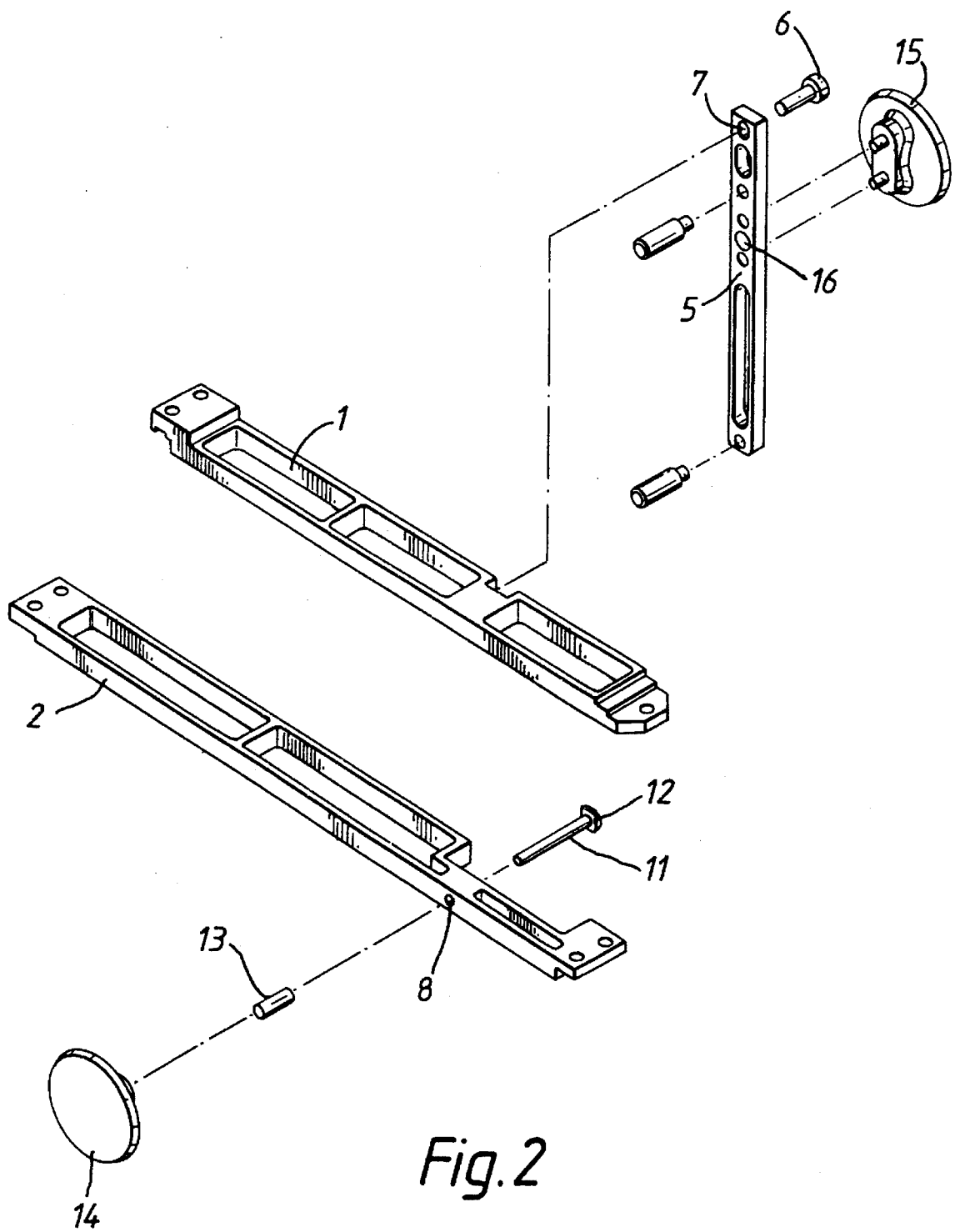
FIG. 2 is an exploded view of the extensometer shown in FIG. 1.

FIGS. 1 and 2 show an extensometer 10 comprising a first displaceable arm 1 and a second displaceable arm 2. Supported by the first displaceable arm 1 is a knife-edge 3 and supported by the second displaceable arm 2 is a second knife-edge 4.

A gauge length setting post 5 is supported on the first arm 1 by passing the shank of a nut or bolt 6 through an aperture 7 provided in the upper portion of the gauge length setting post 5 and engaging the shank with a recess or aperture provided in the first arm 1.

Dimensioned in the second arm 2 is an aperture 8 for supporting a plunger 9. The plunger 9 comprises an elongate element 11, one end 12 of which being configured to a conical shape. Received on the end of the elongate element 11 opposite to that configured to a conical shape is a compression spring 13. The compression spring 13 is retained on the elongate element 11 by an end plate or knob 14 which is secured to the end of the elongate element 11 opposite to that configured to the conical shape.

Secured to the gauge length setting post 5 on one side thereof is a plate or knob 15. Co-axial with the plate or knob 15 on the opposite side of the gauge length setting post 5 thereto is a tapered recess 16.

When the first and second knife-edges 3 and 4 are positioned at a predetermined distance apart, i.e. at gauge length, the conical end 12 of the plunger 9 becomes aligned with the tapered recess 16 dimensioned in the gauge length setting post 5 and is able to be engaged therein by applying a force to the end plate or knob 14 so as to cause the plunger 9 to be displaced against the biasing action of the compression spring 13 to an engaging disposition.

Engaging the conical end 12 of the plunger 9 into the tapered recess 16 couples the first and second arms 1 and 2 together. Maintaining the applied force to the end plate or knob 14 ensures that the knife-edges 3 and 4 are held at gauge length and allows the knife-edges 3 and 4 to be secured to a specimen that is to be tested at the predetermined set distance apart by enabling the first and second arms 1 and 2 to be moved as an integral unit.

Position setting and holding as described above can typically be achieved with one hand by (i) using a finger (or thumb) of one hand to apply the force to the end plate or knob 14 to engage the conical end 12 of the plunger 9 into the tapered recess 16 and couple the first and second arms 1 and 2, and (ii) using the thumb (or a finger) of the same hand to apply a counter force to the plate or knob 15 to enable the coupled first and second arms 1 and 2 to be moved as an integral unit to within a close proximity of the specimen so that the knife-edges can be secured thereto at the predetermined set distance apart.

Once the knife-edges 3 and 4 have been secured to the specimen, for example in the manner hereinafter to be described, the force applied to the end plate or knob 14 of the plunger 9 is released or sufficiently relaxed so as to cause the biasing action of the compression spring 13 to act against the end plate or knob 14 and thereby displace the conical end 12 of the plunger 9 from the tapered recess 16 to decouple the first and second arms 1 and 2.

The first and second displaceable arms 1 and 2 are then able to be displaced under action of the deformation experienced by the specimen when it is placed under load so as to allow the strain of the specimen to be ascertained.

Referring now FIG. 3, there is shown a displaceable arm 20 of an extensometer which, in a preferred embodiment, can be the first or second displaceable arm 1 or 2 of the extensometer 10 described with reference to FIGS. 1 and 2. Supported by the arm 20 is a knife-edge 21 which has a front face 22.

Dimensioned in the arm 20 is a slot 23 into which can be inserted a first clip portion 24 of a clip 30. The clip 30 is of a resilient material and is preferably of spring steel wire.

The first clip portion 24 is of generally V-shape configuration and is formed by two limb parts 25 and 26 connected together by a bridging part 27. In its biased disposition the first clip portion 24 takes up a disposition as shown by the broken lines.

When the first clip portion 24 is inserted into the slot 23, the angle subtended by the limb parts 25 and 26 decreases due to the edges of the slot 23 acting against the biasing action of the first clip portion 24. The biasing action of the first clip portion 24 holds it within the slot 23.

Conveniently, one of the limb parts, in this example the limb denoted by reference numeral 25, is configured to include an engaging portion 28 which engages with a peripheral edge of the slot 23, so as to secure the clip 30 to the arm 20, when the first clip portion 24 is inserted to a holding disposition within the slot 23.

In addition to the first clip portion 24, the clip 30 further comprises a second clip portion 31 and an intermediate clip portion 29 which connects the first clip portion 24 to the second clip portion 31.

The intermediate clip portion 29 is of generally C-shape configuration and provides the bias for the second clip portion 31. The second clip portion 31 is configured so as to end in a loop 33 and in its biased disposition takes up the position illustrated by the broken lines.

The function of the second clip portion 31 of the clip 30 is to engage a specimen 32 at a rear face thereof and for the biasing action of the second clip portion 31 to bear the second clip portion 31 against the rear face of the specimen to secure the specimen 32 against the front face 22 of the knife-edge 21.

This is typically achieved by:

(i) securing the clip 30 to the arm 20 by inserting the first clip portion 24 into the slot 23 in the manner described previously;

(ii) moving the arm 20 so as to bring the loop 33 of the second clip portion 31 into contact with a surface of the specimen 32 remote from the front face 22 of the knife-edge 21;

(iii) moving the arm 20 rearwardly with respect to the specimen 32 to cause the specimen 32 to apply a force to the second clip portion 31 to displace it against its biasing action;

(iv) moving the arm 20 laterally so as to slide the main body part of the second clip portion 31 into engagement with the rear face of the specimen 32 and bring the front face 22 of the knife-edge 21 into alignment with the specimen 32; and (v) moving the arm 20 forwardly so as to bring the front face 22 of the knife-edge 21 into contact with the specimen 32, the specimen 32 being secured to the front face 22 of the knife-edge 21 by the biasing action of the second clip portion 31 bearing the second clip portion 31 against the rear face of the specimen 32.

Figure 3:
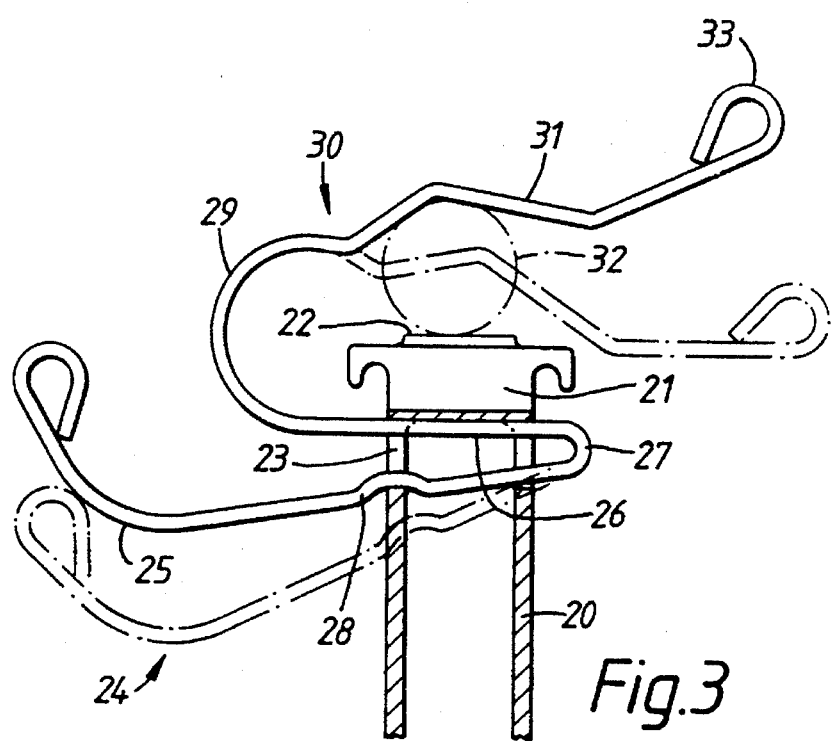
FIG. 3 is a plan view of a biasing arrangement according to the third aspect of the invention.

In an aspect of the invention not illustrated, a clip as described with reference to FIG. 3 is secured to each of the first and second displaceable arms 1 and 2 of the extensometer described with reference to FIGS. 1 and 2 to allow for simple single-handed setting and securing of an extensometer to a specimen.

In this unillustrated aspect of the invention, the knife-edges 3 and 4 supported by the first and second displaceable arms 1 and 2 are single-handedly secured to a specimen at gauge length by (i) coupling the first and second arms 1 and 2 in the manner hereinabove described with reference to FIGS. 1 and 2, (ii) manoeuvring the coupled arms 1 and 2 as an integral unit to bring the second clip portions 31 of each clip 30 to bear against the rear face of the specimen 32 in the manner described with reference to FIG. 3, and (iii) releasing or sufficiently relaxing the force applied to the plunger 9 to decouple the first and second arms 1 and 2 and to allow testing of the specimen to be commenced and the strain experienced thereby under load to be accurately determined.

It will be appreciated by those skilled in the art that it is well within the scope of the present invention for the clips 30 described hereinabove with reference to FIG. 3 to be bent or shaped into different configurations so as to be able to accommodate any cross section and size of specimen.

The position setting device according to the first aspect of the invention and hereinbefore described with reference to FIGS. 1 and 2 has the following advantages over the previous position setting devices proposed for an extensometer:

(1) It is impossible to ruin a test by forgetting to remove a gauge length setting pin, because the spring loaded plunger automatically releases.

(2) There is improved gauge length setting accuracy as the conical end of the plunger engages without float in the gauge length post taper. Previous gauge length setting devices featuring a pin engaged in a hole require clearance to operate. Such clearance produces inaccuracies.

(3) It is quick and simple to operate, making continuous operation less tiring.

(4) There are no separate parts to lose.

The biasing arrangement according to the third aspect of the invention and hereinbefore described with reference to FIG. 3 has the following advantages over the previous biasing arrangements proposed for an extensometer:

(1) It is quick and easy to use.

(2) It is suitable for single-handed left or right hand use.

(3) It is useable over a wide temperature range.

(4) There are no loose parts.

(5) There is a repeatable contact force.

We claim:

1. An extensometer comprising a first element and a second element to be set at a predetermined distance apart and coupling means for setting and holding the two elements at the predetermined distance apart, wherein the coupling means is movable by the action of an applied force against the action of a biasing force to an engaging disposition in which it engages with the two elements to set and hold the two elements at the predetermined distance apart, and wherein the coupling means moves under the action of the biasing force to a disengaged disposition in which it no longer holds the two elements at the predetermined distance apart upon removal or sufficient relaxation of the applied force.

2. An extensometer as claimed in claim 1, wherein the first element comprises a first displaceable arm which supports a first means for engaging a specimen, wherein the second element comprises a second displaceable arm which supports a second means for engaging the specimen, wherein the coupling means in its engaging disposition engages the first and second arms to set and hold the first and second specimen engaging means at a predetermined distance apart, and which in its disengaged disposition no longer holds the first and second specimen engaging means at the predetermined distance apart.

3. An extensometer as claimed in claim 2, wherein the coupling means comprises a first coupling element which is supported by the first arm and which extends to a position in proximity of the second arm and a second coupling element which is supported by the second arm, wherein the second coupling element is movable by the action of an applied force against the action of the biasing force to an engaged disposition in which it engages with the first coupling element to set and hold the first and second specimen engaging means at the predetermined distance apart and wherein the second coupling element moves under the action of the biasing force to a disengaged disposition in which it no longer engages with the first coupling element upon sufficient relaxation of the applied force.

4. An extensometer as claimed in claim 3, wherein the second coupling element has an engaging end so dimensioned as to closely fit in a recess or hole provided in the first coupling element.

5. An extensometer as claimed in claim 4, wherein the second coupling element extends through an opening provided in the second arm and wherein the biasing force is provided by biasing means located on the end of the second coupling element opposite to that which engages with the first coupling element.

6. An extensometer as claimed in claim 5, wherein force applying means are provided at the end of the second coupling element opposite to that which engages with the first coupling element.

7. An extensometer as claimed in claim 6, wherein the second coupling element is brought to its engaging disposition by applying a force to the force applying means, and wherein the biasing means acts to bring the second coupling element to its disengaged disposition upon removal or sufficient relaxation of the applied force.

8. An extensometer as claimed in claim 4, wherein the engaging end of the second coupling element is conical in shape.

9. An extensometer as claimed in claim 4, wherein the recess or hole provided in the first coupling element is tapered.

10. An extensometer as claimed in claim 3, wherein the second coupling element is a plunger.

11. An extensometer as claimed in claim 2, wherein the first and second specimen engaging means are knife-edge elements.

12. An extensometer as claimed in claim 5, wherein the biasing means is a compression spring.

13. A biasing arrangement for holding a first element in contact with a front face of a second element, wherein the biasing arrangement comprises clip means having a first clip portion which engages with the first element, a second clip portion which engages the second element at a rear face thereof and an intermediate clip portion connecting the first and second clip portions, wherein the first clip portion is fixedly secured to the first element and wherein the second clip portion is so shaped and biased by a biasing force as to be engagable with the rear face of the second element by a displacement of the first element to cause a displacement of the clip means and a displacement of the second clip portion against the biasing force thereof to an engaging disposition in which the biasing force of the second clip portion causes the second clip portion to bear against the rear face of the second element and to hold the first element against the front face of the second element.

14. A biasing arrangement as claimed in claim 13, wherein the first clip portion and the first element are so shaped and the first clip portion is so biased by a biasing force that the first clip portion is securable to the first element by a displacement of the clip means in a predetermined direction and by a displacement of the first clip portion against the action of the biasing force thereof and is held to the first element under action of the biasing force.

15. A biasing arrangement as claimed in claim 14, wherein the first element is formed with a slot therein, wherein the first clip portion and the slot are so shaped and the first clip portion is so biased by the biasing force that the first clip portion is insertable in the slot by a displacement of the clip means in the predetermined direction and by a displacement of the first clip portion against the action of the bias thereof and is held within the slot under the action of the bias.

16. A biasing arrangement as claimed in claim 15, wherein the first clip portion is of generally V-shape configuration and is formed by two limb parts connected by a bridging part, wherein the first clip portion is secured to the first element by inserting the bridging part into the slot, wherein the slot is so shaped and the first clip portion so biased by the biasing force that as the first clip portion is inserted into the slot the angle subtended by the limb parts decreases against the action of the bias of the first clip portion, and wherein the action of the bias of the first clip portion holds the first clip portion within the slot.

17. A biasing arrangement as claimed in claim 16, wherein the intermediate clip portion is of generally C-shape configuration and provides the bias for the second clip portion.

18. A biasing arrangement as claimed in claim 16, wherein one of the limb parts of the first clip portion is configured to include an engaging portion which engages with a complementary engaging portion in the slot when the first clip portion is inserted to a holding disposition in the slot to secure the first clip portion within the slot.

19. A biasing arrangement as claimed in claim 15, wherein the first clip portion is inserted into the slot by displacement of the clip means in the predetermined direction and wherein the second clip portion is so positioned as to engage with the rear face of the second element by a displacement of the clip means in the predetermined direction.

20. A biasing arrangement as claimed in claim 13, wherein the clip means is an elongate clip element formed from a resilient material.

21. A biasing arrangement as claimed in claim 20, wherein the elongate clip element is formed from a spring steel wire.

22. A biasing arrangement as claimed in claim 14, wherein the clip means is so configured that the clip means can in a single predetermined displacement in the predetermined direction bring the first clip portion into secure engagement with the first element and the second clip portion into engagement with the rear face of the second element.

23. A biasing arrangement as claimed in claim 13, wherein the first element is a displaceable arm and the second element is a specimen, and wherein the front face of the displaceable arm is constituted by specimen engaging means supported by the displaceable arm.

24. A biasing arrangement for holding a first element in contact with a front face of a second element, wherein the biasing arrangement comprises clip means having a first clip portion which engages with the first element, a second clip portion which engages the second element at a rear face thereof and an intermediate clip portion connecting the first and second clip portions, wherein the first clip portion and the first element are so shaped and the first clip portion is so biased by a biasing force that the first clip portion is secured to the first element under the action of the biasing force and wherein the second clip portion is so shaped and biased by a biasing force as to be engagable with the rear face of the second element by a displacement of the first element to cause a displacement of the clip means and a displacement of the second clip portion against the biasing force thereof to an engaging disposition in which the biasing force of the second clip portion causes the second clip portion to bear against the rear face of the second element and to hold the first element against the front face of the second element.

25. In combination, an extensometer including a displaceable arm and a biasing arrangement for holding the displaceable arm in contact with a front face of a specimen, wherein the biasing arrangement comprises clip means having a first clip portion which engages with the displaceable arm, a second clip portion which engages the specimen at a rear face thereof and an intermediate clip portion connecting the first and second clip portions, wherein the first clip portion is fixedly secured to the displaceable arm and wherein the second clip portion is so shaped and biased by a biasing force as to be engagable with the rear face of the specimen by a displacement of the displaceable arm to cause a displacement of the clip means and a displacement of the second clip portion against the biasing force thereof to an engaging disposition in which the biasing force of the second clip portion causes the second clip portion to bear against the rear face of the specimen and to hold the displaceable arm against the front face of the specimen.

26. In combination, an extensometer comprising first and second displaceable arms to be set at a predetermined distance apart and a biasing arrangement for holding the first and second arms in contact with a front face of a specimen at the predetermined distance apart, wherein the extensometer further comprises coupling means for setting and holding the two arms at the predetermined distance apart, the coupling means being movable by the action of an applied force against the action of a biasing force to an engaging disposition in which it engages with the two arms to set and hold the two arms at the predetermined distance apart and being movable under the action of the biasing force to a disengaged disposition in which it no longer holds the two arms at the predetermined distance apart upon sufficient relaxation of the applied force, wherein the biasing arrangement comprises first clip means for the first arm and second clip means for the second arm, each clip means having:

(i) a first clip portion which engages with the associated arm, (ii) a second clip portion which engages the specimen at a rear face thereof, and (iii) an intermediate clip portion which connects the first and second clip portions, wherein the first clip portions are fixedly secured to the associated arm and wherein the second clip portions are each so shaped and biased by a biasing force as to be engagable with the rear face of the specimen by a displacement of the first and second arms when set and held at the predetermined distance apart by the coupling means to cause a displacement of the first and second clip means and a displacement of the second clip portions against the biasing forces thereof to an engaging disposition in which the biasing forces of the second clip portions cause the second clip portions to bear against the rear face of the specimen and to hold the first and second arms against the front face of the specimen at the predetermined distance apart after the coupling means is brought to the disengaged disposition.

* * * * *